US012725147B2

(12) United States Patent
Smith et al.

(10) Patent No.: US 12,725,147 B2
(45) Date of Patent: Sep. 1, 2026

(54) SYSTEMS AND METHODS FOR PROVISIONING POINT OF SALE TERMINALS

(71) Applicant: Block, Inc., Oakland, CA (US)

(72) Inventors: Malcolm Smith, Toronto (CA); Kshitiz Vadera, Toronto (CA); Afshin Rezayee, Richmond Hill (CA)

(73) Assignee: Block, Inc., Oakland, CA (US)

(*) Notice: Subject to any disclaimer, the term of this patent is extended or adjusted under 35 U.S.C. 154(b) by 0 days.

(21) Appl. No.: 18/537,605

(22) Filed: Dec. 12, 2023

(65) Prior Publication Data

US 2024/0185227 A1 Jun. 6, 2024

Related U.S. Application Data

(60) Division of application No. 17/718,144, filed on Apr. 11, 2022, now Pat. No. 11,887,022, which is a (Continued)

(51) Int. Cl.
*G06Q 20/36* (2012.01)
*G06Q 20/20* (2012.01)
(Continued)

(52) U.S. Cl.
CPC ....... *G06Q 20/3674* (2013.01); *G06Q 20/204* (2013.01); *G06Q 20/3829* (2013.01); *G06Q 20/4012* (2013.01); *G06Q 2220/00* (2013.01)

(58) Field of Classification Search
CPC ............. G06Q 20/3674; G06Q 20/204; G06Q 20/3829; G06Q 20/4012; G06Q 2220/00;
(Continued)

(56) References Cited

U.S. PATENT DOCUMENTS 5,615,335 A 3/1997 Onffroy et al.
6,385,739 B1 5/2002 Barton et al.
(Continued)

FOREIGN PATENT DOCUMENTS

| | | | | |
|---|---|---|---|---|
| WO | 2881429 A1 * | 7/2009 | ............. | G06F 21/34 |
| WO | WO-2009091588 A2 * | 7/2009 | ............. | G06F 21/34 |
| WO | 2009/136404 A2 | 11/2009 | | |

OTHER PUBLICATIONS

Method and Apparatus for Secure Card Transactions (Year: 2012).*
(Continued)

*Primary Examiner* — Patrick Mcatee
(74) *Attorney, Agent, or Firm* — Polsinelli PC

(57) ABSTRACT

A provisioning system is provided for terminals such as point of sale terminals. An interface device interfaces with a smart card and a provisioning server, providing initialization keys and security codes that are stored on the smart card. At a terminal, an initialization key from the smart card may be provided to the terminal if a correct security code is entered at the terminal. The terminal may then provide a terminal authorization package to the smart card. The terminal authorization package is stored on the smart card. At the interface device, the terminal authorization package is provided to the provisioning server. The terminal may then securely communicate transactions with an issuer server.

20 Claims, 11 Drawing Sheets

Related U.S. Application Data continuation of application No. 14/752,672, filed on Jun. 26, 2015, now Pat. No. 11,301,840.

(60) Provisional application No. 62/140,017, filed on Mar. 30, 2015.

(51) Int. Cl.
*G06Q 20/38* (2012.01)
*G06Q 20/40* (2012.01)

(58) Field of Classification Search
CPC ............. G06Q 20/352; G06Q 20/3567; G06Q 20/409; G07F 7/0873
See application file for complete search history.

(56) References Cited

U.S. PATENT DOCUMENTS 7,031,945 B1 * 4/2006 Donner ................ G06Q 20/382 340/4.62
7,386,517 B1 * 6/2008 Donner .............. G06Q 30/0277 705/72
7,472,394 B1 12/2008 Meckenstock et al.
7,783,884 B2 * 8/2010 Nakano ............... H04L 63/0823 713/175
7,840,812 B1 * 11/2010 Levenberg .......... H04L 63/0823 713/176
7,953,989 B1 5/2011 Hsiang et al.
8,429,409 B1 4/2013 Wall et al.
8,600,881 B2 12/2013 Nguyen et al.
9,237,465 B1 1/2016 Tanner et al.
9,251,513 B2 * 2/2016 Nilsson ............. G06Q 20/3823
9,686,026 B1 6/2017 Reed et al.
10,581,855 B1 3/2020 Donovan et al.
11,301,840 B1 * 4/2022 Smith ................ G06Q 20/3674
11,887,022 B2 1/2024 Smith et al.
2002/0007320 A1 1/2002 Hogan et al.
2003/0005289 A1 * 1/2003 Gougeon ............. G07F 7/1008 713/171
2004/0236672 A1 11/2004 Jung et al.
2005/0156026 A1 * 7/2005 Ghosh .................. G06Q 20/341 235/380
2005/0171898 A1 8/2005 Bishop et al.
2007/0067634 A1 * 3/2007 Siegler ............... G06Q 20/3823 713/172
2008/0165951 A1 7/2008 Somers et al.
2008/0301441 A1 12/2008 Calman et al.
2009/0103725 A1 4/2009 Tang et al.
2009/0198618 A1 * 8/2009 Chan ...................... G06Q 20/02 707/E17.014
2010/0036741 A1 * 2/2010 Cleven ................. G06Q 20/105 705/17
2010/0153267 A1 * 6/2010 Ghaidan .............. G06Q 20/105 705/41
2010/0189265 A1 * 7/2010 Ito ........................... H04L 9/083 380/278
2011/0038481 A1 * 2/2011 Modave .................. G06F 21/79 380/277
2011/0089232 A1 4/2011 Kekicheff et al.
2012/0317035 A1 * 12/2012 Royyuru ............. G06Q 20/382 705/16
2014/0248853 A1 9/2014 Shipley
2015/0006407 A1 * 1/2015 Lunn .................. G06Q 20/3226 705/73
2015/0324793 A1 * 11/2015 Guise ....................... G07G 1/14 705/71
2015/0339665 A1 * 11/2015 Hayhow ................ G06Q 20/20 705/71
2017/0061168 A1 3/2017 Sundaram et al.
2018/0026799 A1 1/2018 Pottier et al.
2024/0403854 A1 * 12/2024 Martin ................. G06Q 20/209

OTHER PUBLICATIONS

Mobile Settlement System and Device (Year: 2003).*

Method, Device and Secure Element for Conducting a Secured Financial Transaction on a Device (Year: 2013).*

"EMV Integrated Circuit Card Specifications for Payment Systems", Book 2, Security and Key Management, May 2004, Version 4.1, 187 pages.

"EMV Integrated Circuit Card Specifications for Payment Systems", Book 3, Application Specification, May 2004, Version 4.1, 237 pages.

Gao et al., "A 2D Barcode-Based Mobile Payment System", 2009 Third International Conference on Multimedia and Ubiquitous Engineering, Qingdao, pp. 320-329.

Hamzaoglu et al., "Reducing Test Application Time for Built-in-Self-Test Test Pattern Generators", Proceedings 18th IEEE VLSI Test Symposium, Montreal, Quebec, Canada, 2000, pp. 369-375.

* cited by examiner

SYSTEMS AND METHODS FOR PROVISIONING POINT OF SALE TERMINALS

CROSS REFERENCE TO RELATED APPLICATIONS

This application is a divisional of U.S. patent application Ser. No. 17/718,144, entitled "Systems and Methods for Provisioning Point of Sale Terminals," filed on Apr. 11, 2022, and granted as U.S. Pat. No. 11,887,022 on Jan. 30, 2024, which application is a continuation of U.S. patent application Ser. No. 14/752,672, entitled "Systems and Methods for Provisioning Point of Sale Terminals," filed on Jun. 26, 2015, and granted as U.S. Pat. No. 11,301,840 on Apr. 12, 2022, which application claims the benefit of U.S. Provisional Application No. 62/140,017, filed Mar. 30, 2015, all of which applications are incorporated herein by reference.

BACKGROUND

A point of sale terminal (POS terminal) is an apparatus used in various retail and service industries to carry out a payment transaction and, in particular, a credential-based payment transaction using a payment card or device. POS terminals may come in a variety of forms, including scanners, weigh scales, touch screens, etc. They may be linked with inventory management databases and the like. More generally, POS terminals can be used in other contexts outside of payment, such as general authentication using some sort of authentication card, device or credential.

As commonly used today, a POS terminal generally includes a card reader device, a small screen and an input keypad. The POS terminal is attached to a host device, such as a register device. To carry out a payment transaction, a merchant starts the transaction by entering the amount and mode of payment. The customer's payment card is read to complete the transaction. More sophisticated terminals will support one or more forms of payment defined by the EMV standards (e.g., based on the ISO/IEC 7816 standards for contact cards, and ISO/IEC 14443 for contactless cards). In such cases, the customer may be requested to provide a credential, such as a PIN, to complete the transaction.

In order for a POS terminal to be certified compliant with the EMV standards, it must successfully pass rigorous compliance testing performed by an accredited testing house. Such testing has two levels: EMV Level 1, which covers physical, electrical and transport level interfaces, and EMV Level 2, which covers payment application selection and credit financial transaction processing.

It may also be necessary to certify the POS terminal for compliance with other standards, such as the Payment Card Industry Data Security Standard (PCI-DSS).

BRIEF DESCRIPTION OF THE DRAWINGS

A preferred embodiment of the present invention will now be described in detail with reference to the drawings, in which.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein.

For compliance with EMV or PCI requirements, POS terminals are generally provisioned with a unique identifier and one or more cryptographic keys. Because a master key may be used, and to prevent unauthorized provisioning of POS terminals, this provisioning process most often takes place in a secure facility. Often, the manufacturer of the POS terminal provides and maintains the secure facility to facilitate quick provisioning of devices.

However, the maintenance of a secure facility simply for provisioning is cumbersome and inefficient. It can be onerous for a computer hardware manufacturer to provide all of the physical security and other safeguards required to meet financial industry standards.

Described herein are methods, systems and apparatus that provide for securely transporting cryptographic keys to a desired key injection facility, injecting those cryptographic keys and provisioning POS terminals, and securely communicating terminal information back to the relying party.

In particular, the key injection can be accomplished using an interface already present on a common POS terminal, such as the card reader.

Figure 1A:
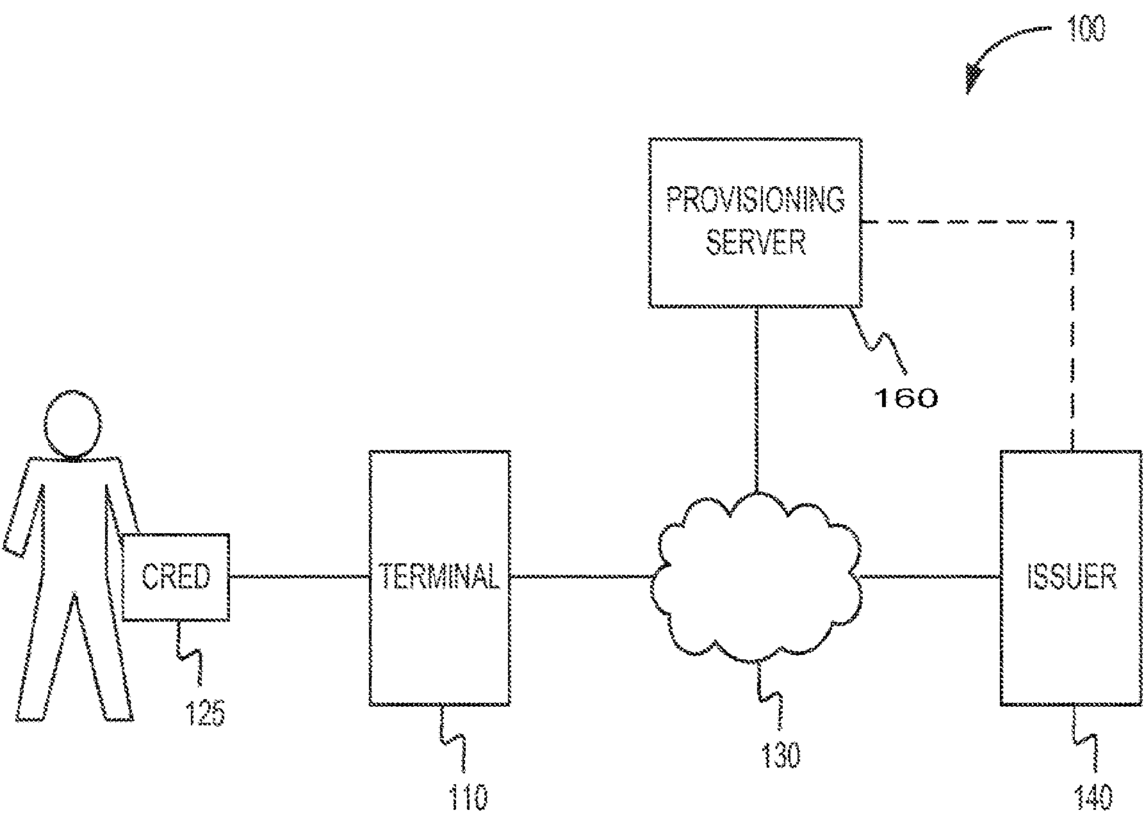
FIG. 1A is a block diagram of a transaction processing system.

Referring now to FIG. 1A, there is illustrated a block diagram of a transaction processing system. System 100 may be generally used to carry out financial transactions, such as retail payment and the like. In some embodiments, system 100 may be used to perform authentication transactions, for example verifying a user's credential as at a government office.

System 100 includes an issuer server 140, a data network 130, a POS terminal device 110, and a user credential 125, which is typically in the possession of an end user 120. Also shown is a provisioning server 160, which may be initially used in the provisioning of POS terminal 110.

User credential 125 may be a credit card equipped with a GlobalPlatform Secure Element or other smart chip. User credential 125 may further be equipped for contactless communication using, for example, radiofrequency identification (RFID) or other related technologies (e.g., ISO/IEC 14443/15693, Sony Felica, NFC, etc.). In some cases, user credential 125 may be a hardware device, such as a smartphone, equipped with a NFC interface.

In use, user credential 125 is presented to terminal 110, which is equipped with a suitable card reader device. For example, if user credential 125 is equipped for contactless communication, terminal 110 may be equipped with a RFID reader to interrogate and communicate with the user credential.

Terminal 110 is further equipped with a network interface, as described below, for communication with issuer server 140 via data network 130.

Network 130 can include a local area network or a wide area network (e.g., the Internet), or some combination thereof. In general, communications between terminal 110 and issuer server 140 are encrypted, either using a suitable encryption protocol, a secure virtual private network, or both. In some embodiments, terminal 110 may be directly coupled to an issuer server 140 via dedicated communication lines.

To facilitate secure communication between terminal 110 and issuer server 140, terminal 110 generally authenticates itself using, for example, a unique identifier and by cryptographically signing data using a secret key (e.g., a private key of a cryptographic key pair). The unique identifier and cryptographic keys may be established during a provisioning process, as described further herein. Issuer server 140 may similarly authenticate itself and cryptographically sign data.

Issuer server 140 can include one or more computer servers operated by the issuers of credential 125, and configured to authenticate and verify transactions carried out using credential 125. Issuer server 140 is shown as a single entity for ease of exposition, however it will be understood that multiple parties may work in conjunction to provide the services attributed herein to issuer server 140.

Figure 1B:
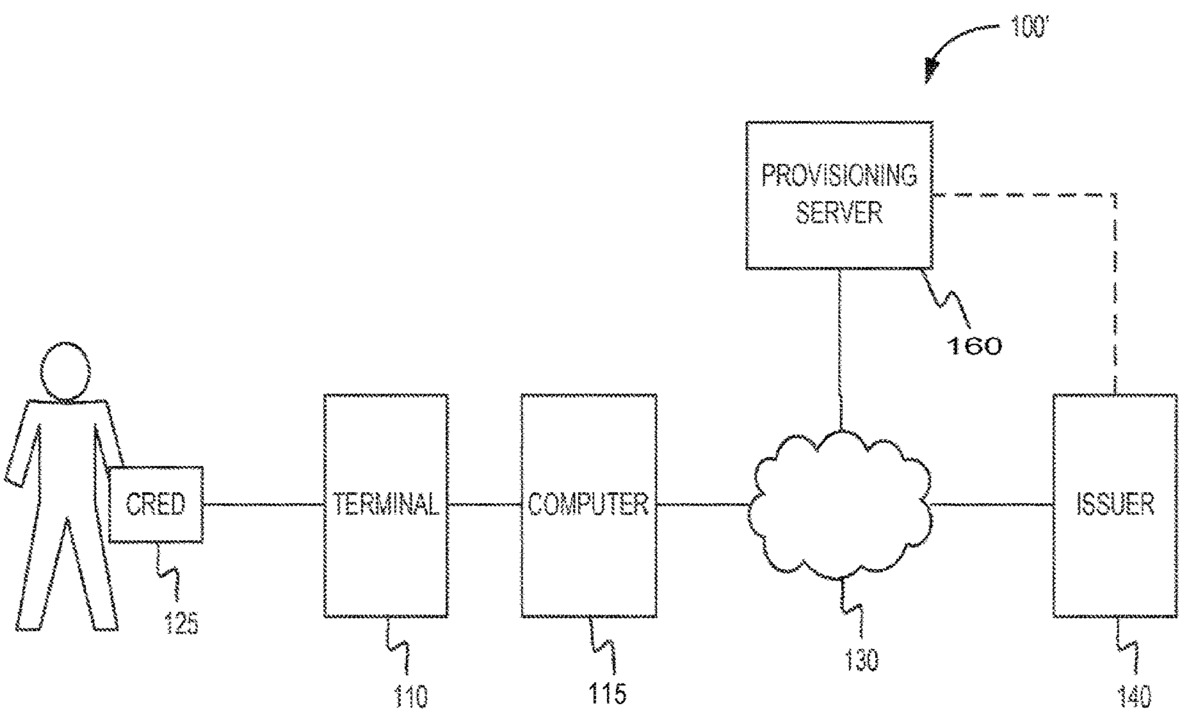
FIG. 1B is a block diagram of a variant transaction processing system.

Referring now to FIG. 1B, there is illustrated a block diagram of a variant transaction processing system. System 100' and its components are generally analogous to system 100, except that POS terminal 110 may be connected to data network 130 via a computer 115. For example, computer 115 may be a personal computer or a computer server, which may be linked to terminal 110 via a data communication interface such as wireless interface (e.g., Bluetooth®) or wired interface (e.g., Universal Serial Bus (USB)). Computer 115 may be further linked to data network 130 via a network interface, such as Ethernet, for example.

Figure 2:
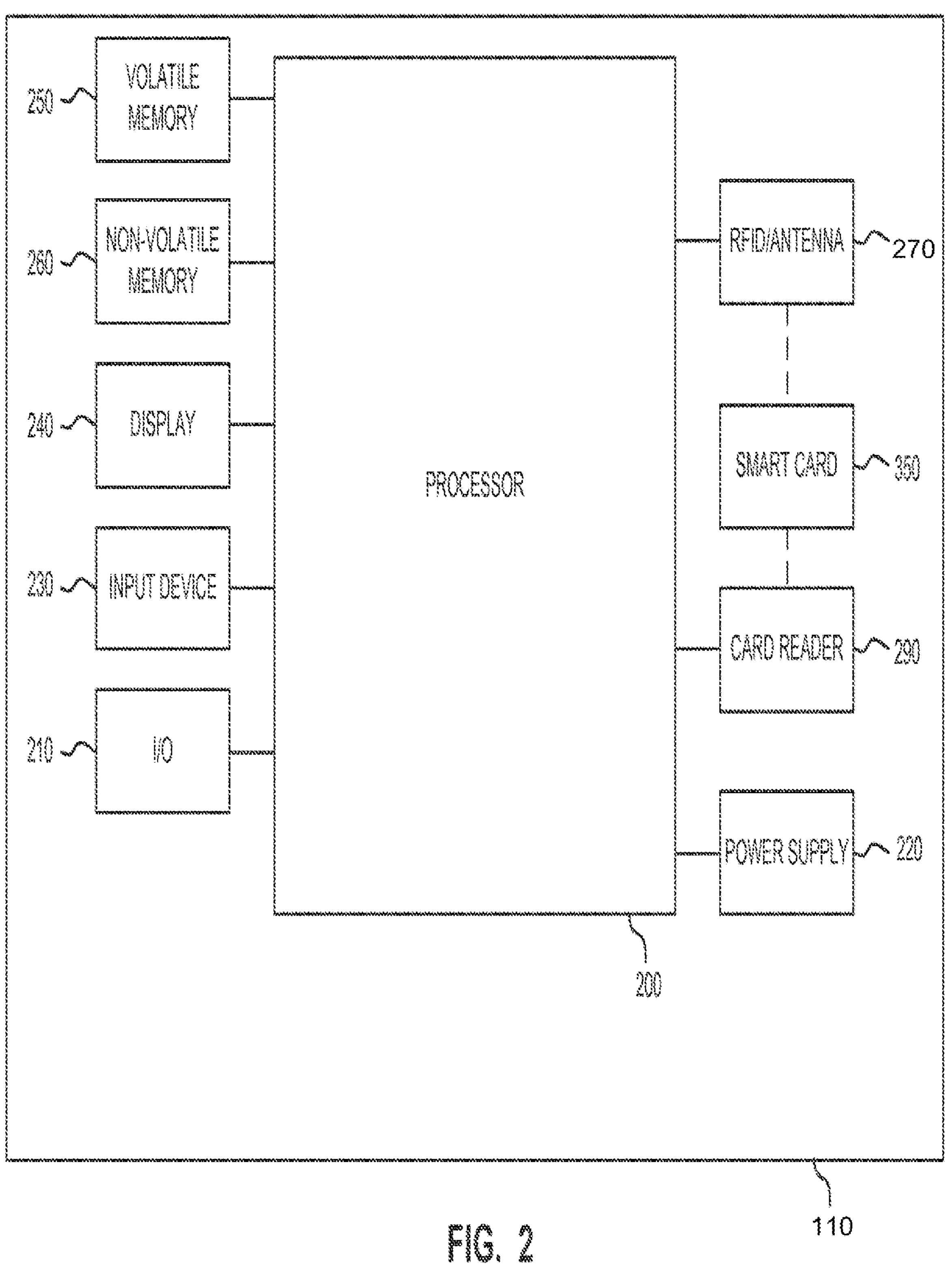
FIG. 2 is a system block diagram of the terminal of FIGS. 1A and 1B.

Referring now to FIG. 2, there is illustrated a system block diagram of the POS terminal 110 of FIGS. 1A and 1B.

Terminal 110 includes a processor 200, an input/output (I/O) interface 210, a power supply 220 (e.g., battery), an input device 230 (e.g., keyboard/keypad), an output device 240 (e.g., display), a volatile memory 250 and a non-volatile memory 260. Terminal 110 can include a card reader interface 290, for contact communication with a smart card 350. Smart card 350 may also include and be referred to as a secure element. Card reader interface 290 may support, for example, the ISO/IEC 7816 standards for contact cards.

Terminal 110 may include a contactless card reader 270 for contactless communication with smart card 350. Contactless card reader 270 may include an RF frontend and a suitable antenna. Contactless card reader 270 may support, for example, the ISO/IEC 14443 standards for contactless cards.

Smart card 350 may be a contact card, for example, in accordance with the ISO/IEC 7816 standards. Smart card 350 may also be a contactless card, for example, in accordance with the ISO/IEC 14443 standards. In some cases, smart card 350 may support both contactless and contact communication.

Although not shown, terminal 110 may also generally include one or more testing and general debugging interfaces 280, such as a port compliant with the IEEE 1149.1 Standard Test Access Port and Boundary-Scan Architecture, also sometimes referred to as the Joint Test Action Group (JTAG) port. General debugging interface 280 allows a programming device to transfer firmware to an internal non-volatile memory of terminal 110.

I/O interface 210 may be a wired or wireless communication interface, such as for the Bluetooth® protocol, USB protocol, Ethernet or other protocol families for data communication.

Volatile memory 250 may be a random access memory, used by processor 200 to temporarily store data and computer executable instructions. Non-volatile memory 260 may be a mass storage memory, such as flash memory, used by processor 200 for long-term storage of programs and data. Non-volatile memory 260 stores the firmware used by processor 200, which includes data and one or more control programs and application programs executed by processor 200.

Processor 200 can include one or more processor cores capable of general purpose computer processing. For example, the processor cores may be Reduced Instruction Set Computing (RISC) processors.

Processor 200 may also include one or more secure components, which may execute limited instruction sets and which may have one or more anti-tamper measures, to prevent the unauthorized modification or execution of executable programs.

Figure 3:
FIG. 3 is a block diagram of a system for a first stage of terminal provisioning.
Figure 3:
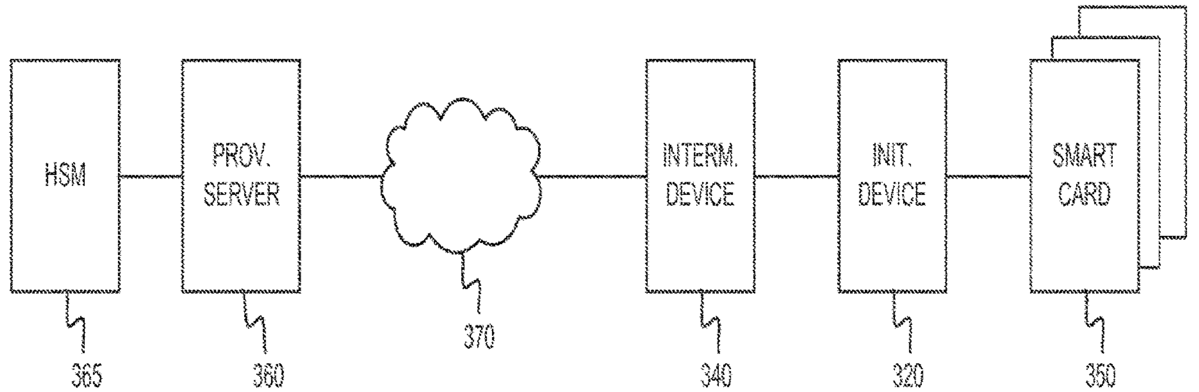

Referring now to FIG. 3, there is illustrated a block diagram of a system for a first stage of terminal provisioning. System 300 may be generally used to begin the process of provisioning POS terminals, such as POS terminal 110 of FIGS. 1A, 1B and 2. The first stage of the terminal provisioning may be carried out, for example, in a secure facility operated by a financial institution or payment processing party. The secure facility may be separate from the POS terminal manufacturing facility.

System 300 includes a provisioning server 360, a data network 370, an intermediate device 340, an initialization device 320 and one or more smart cards 350. In some cases, provisioning server 360 may also have a hardware security module (HSM) 365, which is a physical computing device that safeguards and manages digital keys for strong authentication and provides cryptographic processing. HSM 365 may be a plug-in card or an external device that attaches directly to provisioning server 360.

Provisioning server 360 is a computer server that comprises a processor, memory, data storage, and a network interface for communication with data network 370. The operation of provisioning server 360 is described further herein. Provisioning server 360 is typically operated by an entity, such as a payment processor or card issuer, which authorizes POS terminals for use in payment transactions.

Data network 370 can include a local area network or a wide area network (e.g., the Internet), or some combination thereof.

Intermediate device 340 is generally a general purpose computer including a processor, memory and network interface, which is capable of interfacing initialization device 320 to network 370.

Figure 4:
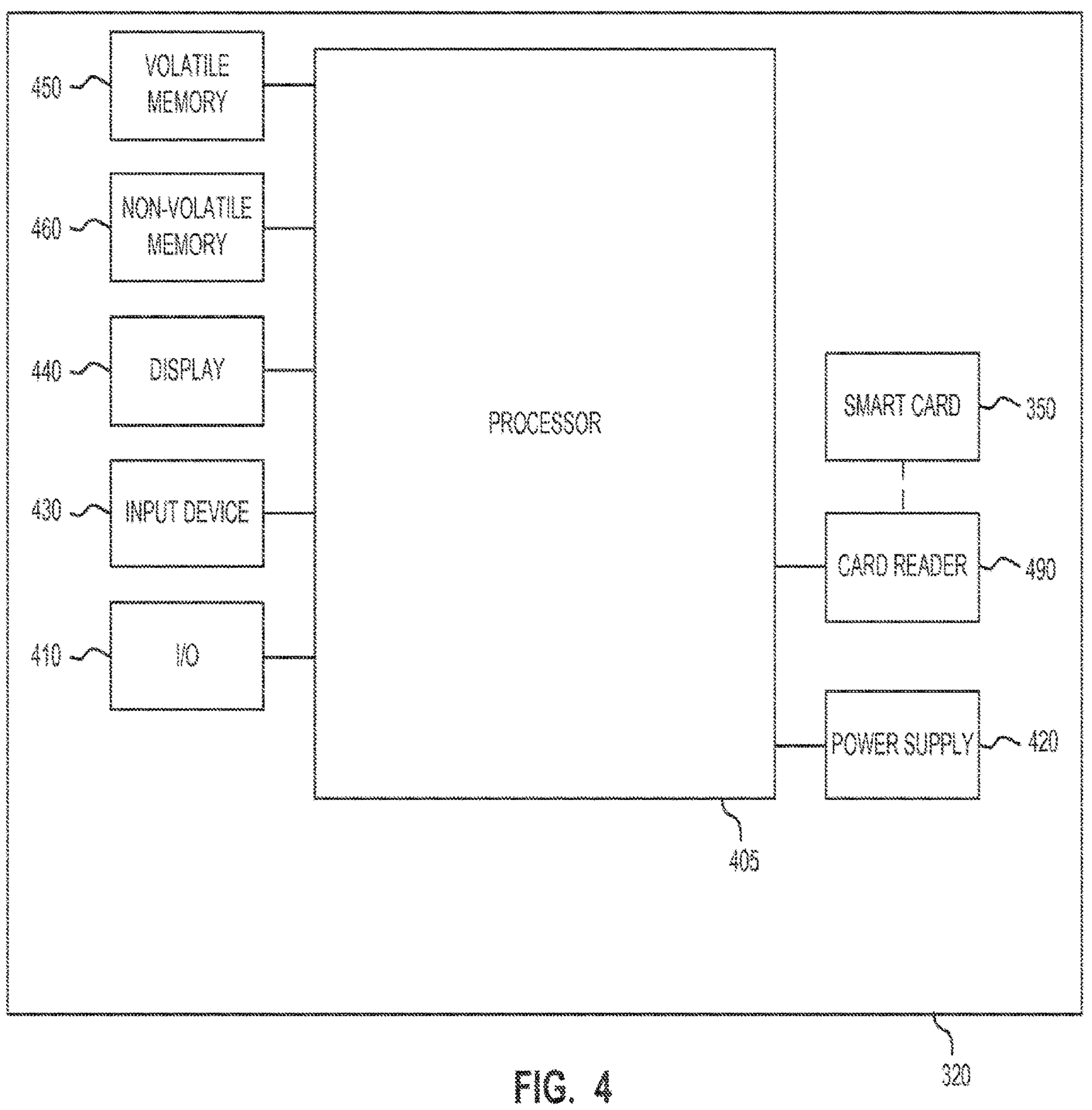
FIG. 4 is a system block diagram of the initialization device of FIG. 3.

Initialization device 320 is a computing device for interfacing and communicating with one or more smart card 350. Referring now to FIG. 4, there is illustrated a system block diagram of the initialization device 320 of FIG. 3.

Initialization device 320 is generally configured to interface with one or more smart card 350, to enable the smart card 350 for use in provisioning POS terminals, such as POS terminal 110.

Initialization device 320 includes a processor 405, an input/output (I/O) interface 410, a power supply 420 (e.g., battery), an input device 430 (e.g., keyboard/keypad), an output device 440 (e.g., display), a volatile memory 450 and a non-volatile memory 460. Initialization device 320 can include a card reader interface 490, for contact communication with a smart card 350. Card reader interface 490 may support, for example, the ISO/IEC 7816 standards for contact cards.

In some cases, initialization device 320 may include a contactless card reader (not shown) for contactless communication with smart card 350.

Operation of initialization device 320 is described further herein.

Figure 5A:
FIG. 5A is a block diagram of a system for a second stage of terminal provisioning.
Figure 5A:
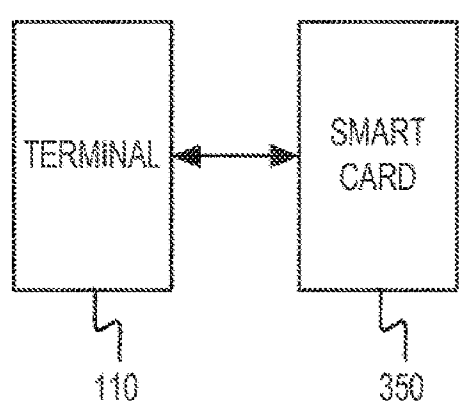

Referring now to FIG. 5A, there is illustrated a system for a second stage of terminal provisioning. System 500A may be used to continue the process of provisioning POS terminals once the first stage, shown in FIG. 3, has been completed. The second stage can be carried in any location, such as the POS terminal manufacturing facility, a warehouse, or other place.

System 500A can simply include the smart card 350 provisioned in the first stage of provisioning, and one or more POS terminal 110. The second stage provisioning is described further herein.

Figure 5B:
FIG. 5B is a block diagram of a system for a third stage of terminal provisioning.
Figure 5B:
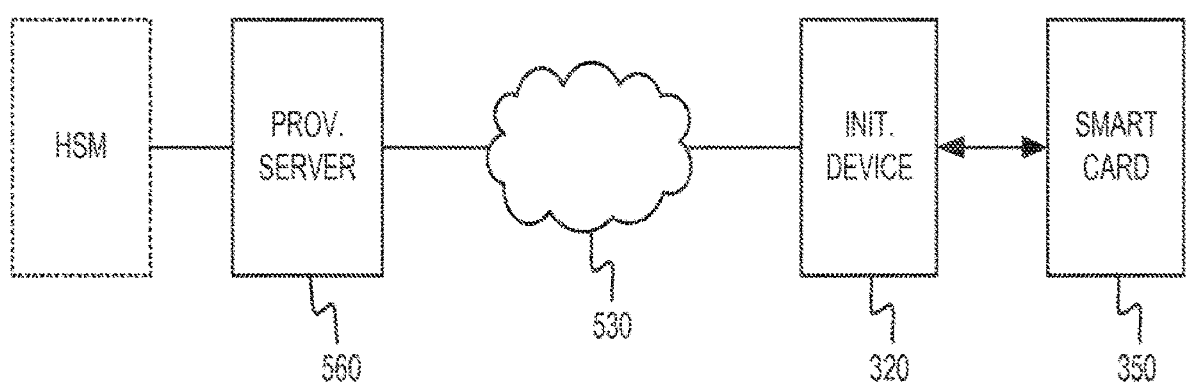

Referring now to FIG. 5B, there is illustrated a system for a third stage of terminal provisioning. System 500B may be used to complete the process of provisioning POS terminals once the first stage, shown in FIG. 3, and the second stage, shown in FIG. 5A, have been completed. The third stage can be carried out in any location.

System 500B can include the smart card 350 provisioned in the first stage of provisioning, and used in the second stage, an initialization device 320 (which may be the same as the initialization device 320 from the first stage provisioning), a data network 530 and provisioning server 560 from the first stage provisioning. The third stage provisioning is also described further herein.

Figure 6:
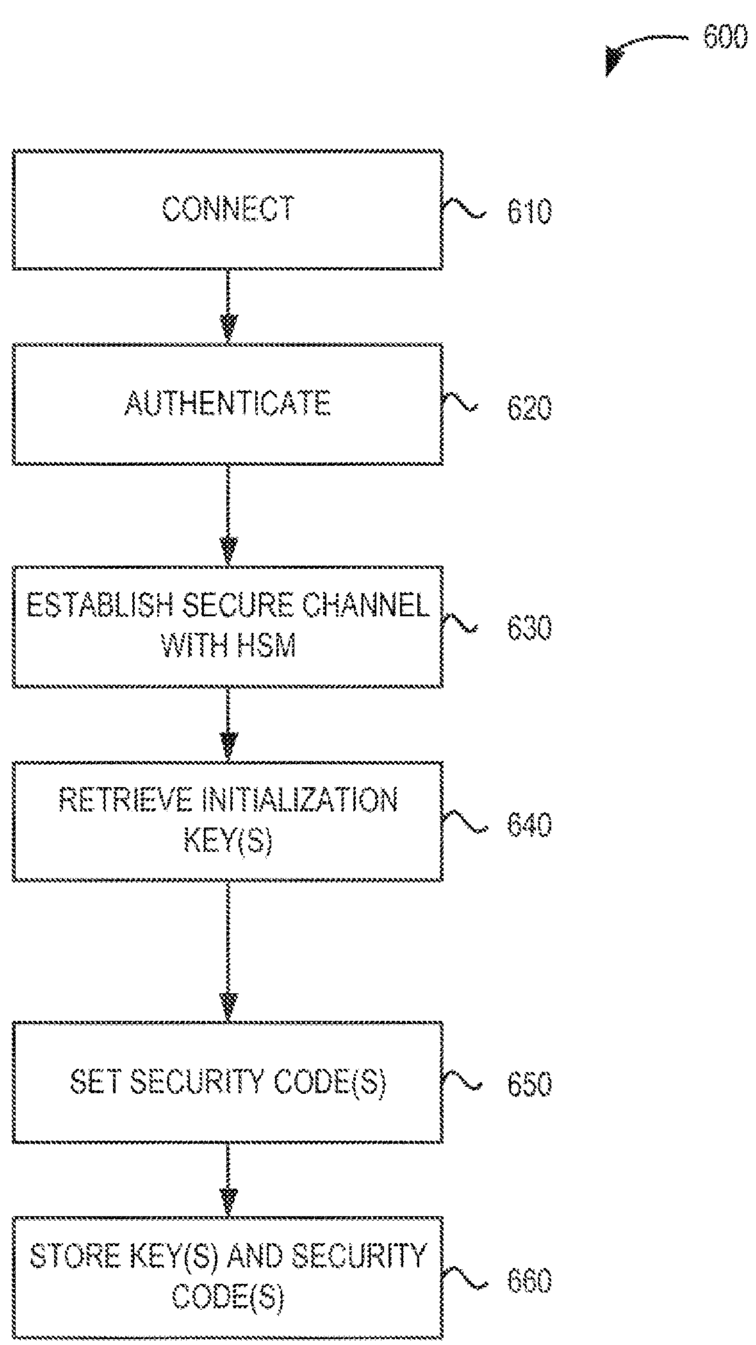
FIG. 6 is a flow diagram of a process of carrying out the first stage provisioning using the first stage provisioning system of FIG. 3.

Referring now to FIG. 6, there is illustrated a process of carrying out the first stage provisioning, for example using the first stage provisioning system of FIG. 3.

Process 600 can be carried out by a smart card 350, which is interfaced with an initialization device 320.

At 610, smart card 350 connects to provisioning server 360, via initialization device 320 and data network 370. The smart card 350 authenticates with provisioning server 360 at 620, using a previously configured key.

If authentication is successful, smart card 350 at 630 initiates a secure communication channel with the HSM of provisioning server 360. In some embodiments where an HSM is not used, this action may be omitted.

At 640, smart card 350 retrieves one or more initialization keys from the provisioning server or HSM (if applicable). In some cases, the initialization key can be a master public key of the provisioning server or HSM. To prevent fraudulent use of smart card 350 to initialize unauthorized POS terminals, one or more security code such as a PIN may be configured at 650.

The security code can be input via an input keypad of initialization device 320.

Preferably, multiple security codes are configured, which will require entry of the multiple security codes to unlock smart card 350 for the second stage provisioning.

Each initialization key and security code is then stored in a memory of the smart card 350 at 660. The smart card 350 can be removed from initialization device 320 and transported to another facility, where it can be used in the second stage provisioning.

It will be appreciated that multiple smart cards 350 can be configured using the same process. Each smart card thus configured can be transported to different locations, although in some cases multiple smart cards may be provided to the same location.

When a smart card 350 is transported, each corresponding security code is also provided to one or more recipient at the intended location. The security codes can be transmitted using a secure channel. If there are multiple security codes, preferably each is transmitted separately, to prevent unauthorized interception of all the necessary security codes.

Figure 7A:
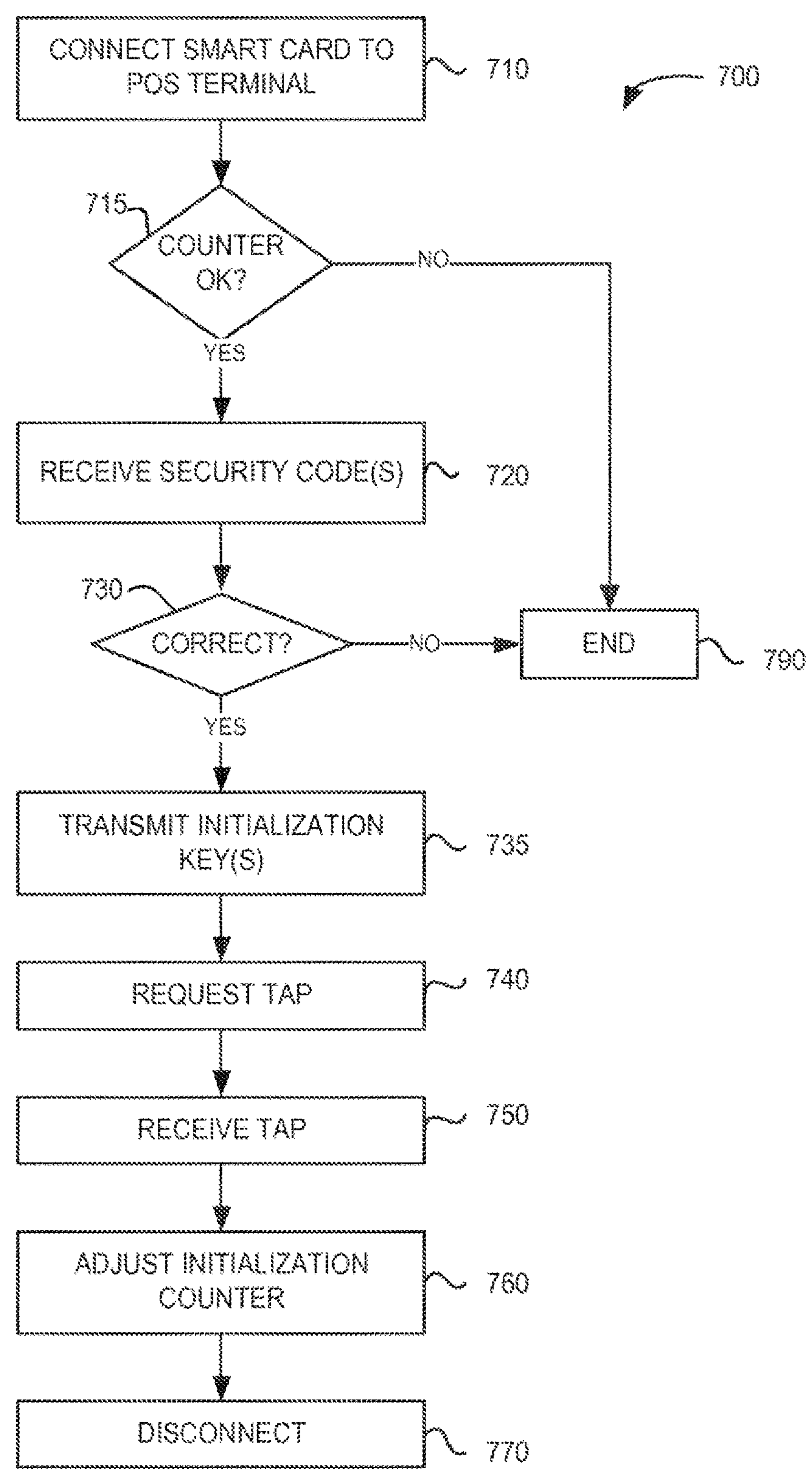
FIG. 7A is a flow diagram of a process of carrying out a second stage provisioning using the second stage provisioning system of FIG. 5A, as performed by the smart card.

Referring now to FIG. 7A, there is illustrated a process of carrying out a second stage provisioning, for example using the second stage provisioning system of FIG. 5A. Process 700 is carried out by a smart card.

Process 700 begins at 710, by connecting a smart card to a corresponding reader of a POS terminal, such as terminal 110. The smart card detects the connection and determines that one or more security codes is required. The security code request is transmitted to the terminal 110.

At 715, the smart card determines if an initialization counter has reached a preconfigured limit. The initialization counter may be preconfigured during the first stage provisioning, to set a limited number of terminal authorizations using any single smart card. Thus, if a smart card is lost or stolen, it can only be used a limited number of times to provision unauthorized terminals.

At 720, terminal 110 processes the security code request, displays a corresponding message on a display, and receives one or more security codes via an input device, such as a keypad. The received one or more security codes is transmitted to the smart card for verification.

At 730, the smart card determines if the received one or more security code is correct. If any received security code is incorrect, process 700 may be discontinued, or another request may be issued.

If each received security code is correct, the smart card transmits at 735 the initialization key (e.g., master public key) of the provisioning server to the terminal.

At 740, a request for a terminal authorization package (TAP) is transmitted to the terminal.

At 750, the smart card receives the TAP from the terminal 110. As described below, the TAP may include a unique identifier of the terminal, a cryptographic key of the terminal (e.g., a private key), or any combination thereof. Terminal 110 may generate the unique identifier or the cryptographic key, or both, as needed.

Optionally, at 760, the smart card decrements the initialization counter. It will be appreciated that the initialization counter may alternatively be incremented up to a preconfigured value.

At 770, the smart card is disconnected from the terminal 110.

Figure 7B:
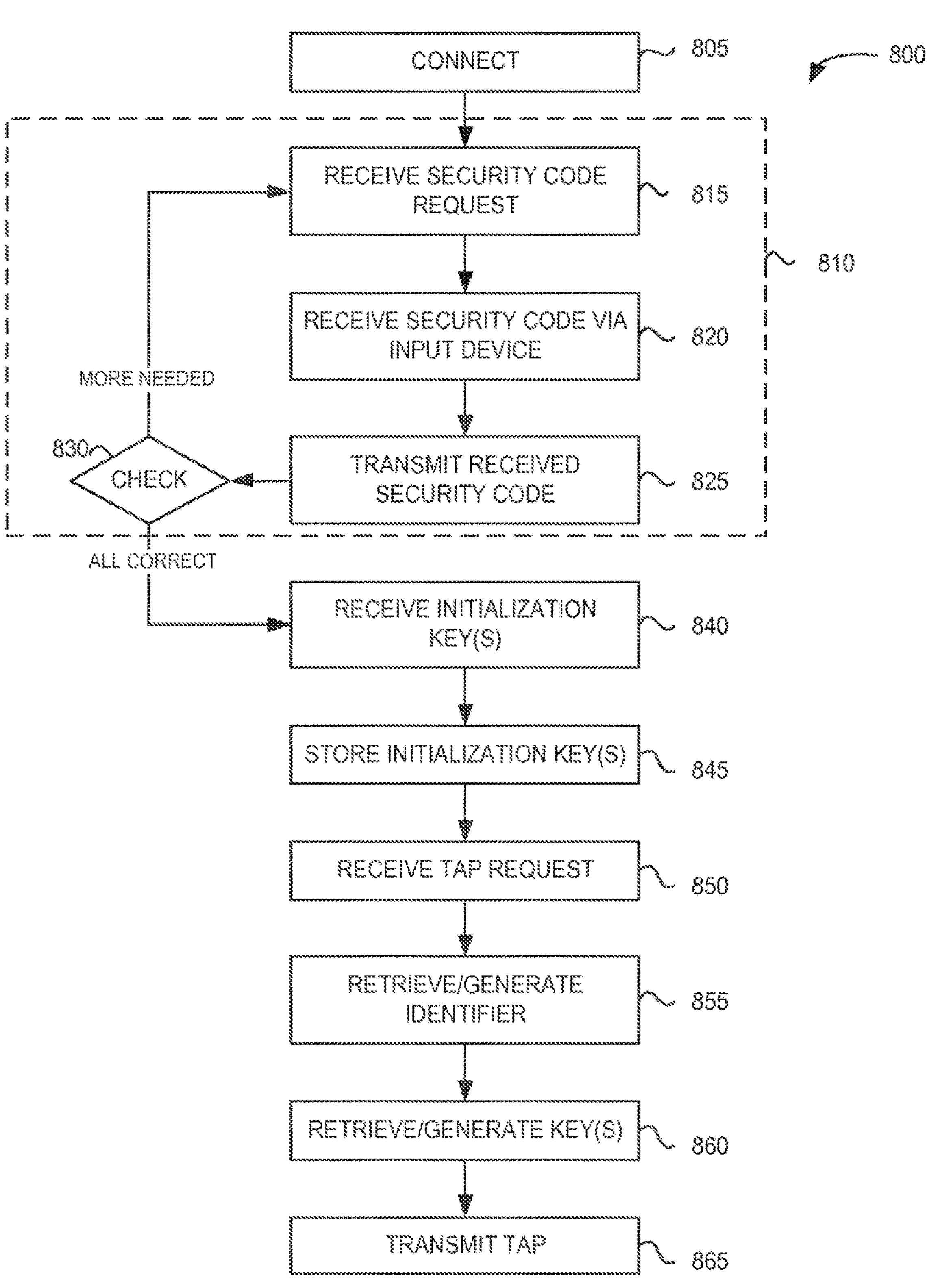
FIG. 7B is a flow diagram of the process of carrying out the second stage provisioning using the second stage provisioning system of FIG. 5A, as performed by the terminal.

Referring now to FIG. 7B, there is illustrated a corresponding process, as performed by a POS terminal, of carrying out a second stage provisioning, for example using the second stage provisioning system of FIG. 5A.

Process 800 begins at 805, by connecting the smart card to a corresponding reader of the POS terminal, such as terminal 110.

At 810, a security code entry subprocess is performed. The POS terminal receives a security code request at 815, retrieves a security code via an input device at 820, and transmits the received security code to the smart card at 825. If additional security codes are required, this is determined at 830 and the subprocess repeats.

Once the appropriate security codes have been provided, the terminal receives the initialization key of the provisioning server from the smart card at 840, and stores the initialization key in non-volatile memory at 845.

Likewise, the terminal receives a TAP request from the smart card at 850.

If a unique identifier for the terminal has been previously stored in non-volatile memory, it is retrieved at 855. Otherwise, the terminal may generate the unique identifier and store it in non-volatile memory.

If a terminal cryptographic key or keys has been previously stored in non-volatile memory, it is retrieved at 860. Otherwise, the terminal may generate the cryptographic key or keys and store them in non-volatile memory.

At 865, the TAP—comprising the unique identifier and terminal cryptographic key (or keys)—is transmitted to the smart card.

Figure 8:
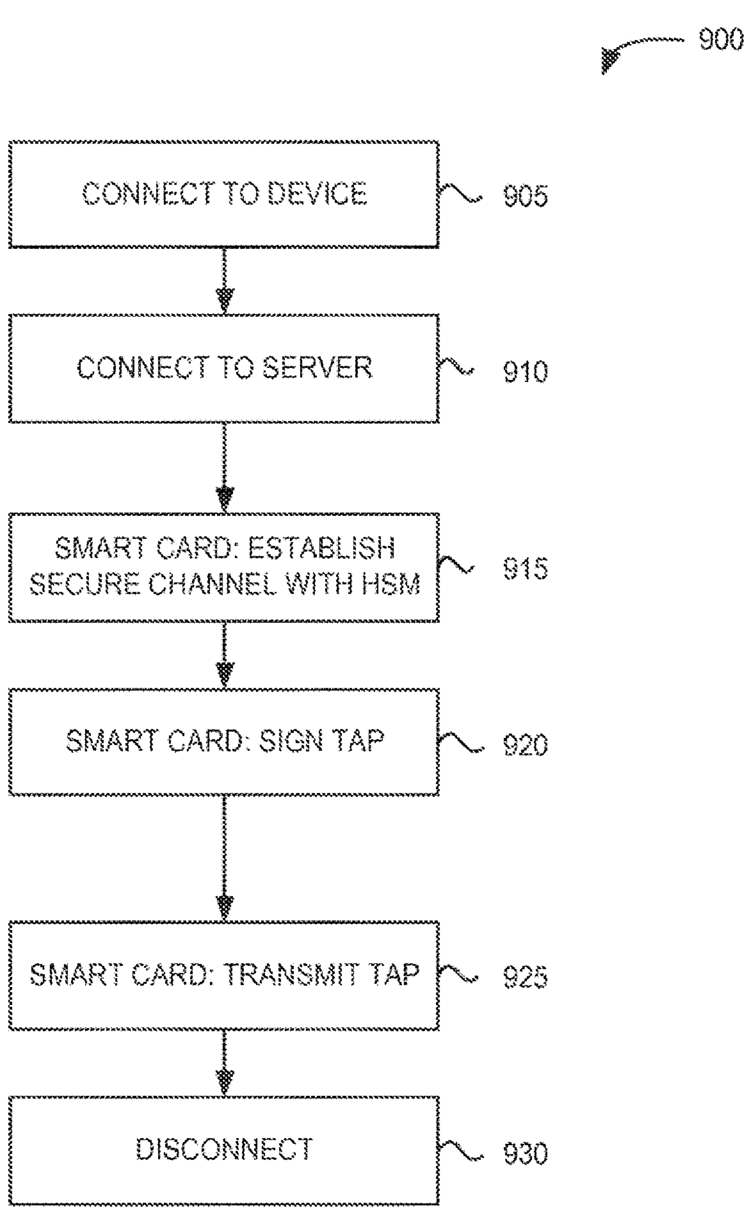
FIG. 8 is a flow diagram of a process of carrying out a third stage provisioning using the third stage provisioning system of FIG. 5B.

Referring now to FIG. 8, there is illustrated a process of carrying out a third stage provisioning, for example using the third stage provisioning system of FIG. 5B.

Process 900 begins at 905, by connecting the smart card to a corresponding reader of an initialization device, such as initialization device 320.

At 910, the initialization device connects to the provisioning server, for example, via an intermediate device 340 and data network 370.

Optionally, if an HSM is being used, the smart card may open a secure connection to the HSM at 915.

At 920, the smart card cryptographically signs the TAP for each terminal 110 it has provisioned. In some embodiments, each individual component of the TAP (e.g., unique identifier, key) may be individually signed.

At 925, the signed TAP for each provisioned terminal is transmitted to the HSM, where it is stored. In embodiments without an HSM, the signed TAPs are simply stored by the provisioning server.

At 930, the initialization device disconnects from the provisioning server. The smart card may also be disconnected.

Aspects of the embodiments described herein may be implemented in hardware or software, or a combination of both. These aspects may be implemented in computer programs which execute on programmable computers, each computer including at least one processor, a data storage system (including volatile memory or non-volatile memory or other data storage elements or a combination thereof), and at least one communication interface, as described herein. The various programmable computers may be a server, network appliance, set-top box, embedded device, computer expansion module, personal computer, laptop, personal data assistant, cellular telephone, smartphone device, tablet and wireless hypermedia device, or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and any combination thereof.

Each program may be implemented in a high level procedural or object oriented programming or scripting language, or both, to communicate with a computer system. However, alternatively the programs may be implemented in assembly or machine language, if desired. The language may be a compiled or interpreted language.

Furthermore, the systems and methods of the described embodiments are capable of being distributed in a computer program product including a physical, non-transitory computer readable medium that bears computer usable instructions for one or more processors, where the storage medium so configured causes a computer to operate in a specific and predefined manner to perform the functions described herein. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

The present invention has been described here by way of example only, while numerous specific details are set forth herein in order to provide a thorough understanding of the example embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these example embodiments. The scope of the claims should not be limited by the described embodiments and examples, but should be given the broadest interpretation consistent with the description as a whole.

We claim:

1. An initialization device comprising:

a card reader configured to interface with a smart card;

a network interface configured to communicate with a provisioning server; and a processor configured to establish a secure channel between the smart card and the provisioning server, receive one or more initialization keys from the provisioning server, transmit the one or more initialization keys to the smart card, and transmit one or more security codes to the smart card, wherein the one or more initialization keys enable the smart card to provision a point of sale terminal prior to deployment of the point of sale terminal for secure processing of transactions.

2. The initialization device of claim 1, wherein the secure channel is established based on a previously configured key stored at the smart card.

3. The initialization device of claim 1, wherein the network interface comprises an intermediate computing device, wherein the intermediate computing device is in communication with the initialization device via a short range communication interface and with the provisioning server via a network.

4. The initialization device of claim 3, wherein the short range communication interface is a wireless interface.

5. The initialization device of claim 3, wherein the short range communication interface is a wired interface.

6. The initialization device of claim 1, wherein the processor is configured to receive a terminal authorization package from the smart card and transmit the terminal authorization package to the provisioning server.

7. The initialization device of claim 6, wherein the terminal authorization package is signed based on a private key of the smart card.

8. The initialization device of claim 1, wherein the provisioning server comprises a hardware security module (HSM), and wherein the secure channel is established between the smart card and the HSM of the provisioning server.

9. The initialization device of claim 1, wherein the processor is configured to transmit an initialization counter value to the smart card.

10. The initialization device of claim 1, further comprising an input device configured to receive the one or more security codes, wherein the processor is configured to transmit the one or more security codes to the smart card via the card reader.

11. An initialization device comprising:

a card reader configured to interface with a smart card;

a network interface configured to communicate with a provisioning server; and a processor configured to establish a secure channel between the smart card and the provisioning server, receive a terminal authorization package from the smart card for each point of sale terminal provisioned by the smart card and transmit the terminal authorization packages for each of the point of sale terminals provisioned by the smart card to the provisioning server.

12. The initialization device of claim 11, wherein each terminal authorization package is cryptographically signed by the smart card.

13. The initialization device of claim 12, wherein the terminal authorization package is signed based on a private key of the smart card.

14. The initialization device of claim 12, wherein individual components of the terminal authorization package are cryptographically signed by the smart card.

15. The initialization device of claim 14, wherein the individual components of the terminal authorization package include at least one of a unique identifier of the point of sale terminal or a key.

16. The initialization device of claim 11, wherein the network interface comprises an intermediate computing device, wherein the intermediate computing device is in communication with the initialization device via a short range communication interface and with the provisioning server via a network.

17. The initialization device of claim 16, wherein the short range communication interface is one of a wired interface or a wireless interface.

18. The initialization device of claim 11, wherein the provisioning server comprises a hardware security module (HSM), and wherein the secure channel is established between the smart card and the HSM of the provisioning server.

19. The initialization device of claim 11, wherein the processor is configured to receive one or more initialization keys from the provisioning server and transmit the one or more initialization keys to the smart card.

20. The initialization device of claim 19, further comprising an input device configured to receive one or more security codes, and wherein the processor is configured to transmit the one or more security codes to the smart card via the card reader.

* * * * *